(12) United States Patent
Dean, II

(10) Patent No.: US 7,637,988 B2
(45) Date of Patent: Dec. 29, 2009

(54) SWING BED CANISTER WITH HEAT TRANSFER FEATURES

(75) Inventor: Walter C. Dean, II, Simsbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 353 days.

(21) Appl. No.: 11/690,201

(22) Filed: Mar. 23, 2007

(65) Prior Publication Data

US 2008/0233019 A1    Sep. 25, 2008

(51) Int. Cl.
*B01D 53/04* (2006.01)

(52) U.S. Cl. .............................. 96/121; 96/126; 96/152; 422/177

(58) Field of Classification Search .................. 96/108, 96/121, 126–128, 130, 152; 423/220, 228, 423/230; 422/177–179
See application file for complete search history.

(56) References Cited

U.S. PATENT DOCUMENTS

| | | | |
|---|---|---|---|
| 3,608,060 A | 9/1971 | Osment et al. | |
| 4,046,529 A * | 9/1977 | Fletcher et al. | 96/127 |
| 4,444,727 A * | 4/1984 | Yanagihara et al. | 422/223 |
| 5,061,455 A | 10/1991 | Brose et al. | |
| 5,876,486 A | 3/1999 | Steinwandel et al. | |
| 5,876,488 A | 3/1999 | Birbara et al. | |
| 6,142,151 A | 11/2000 | Dean | |
| 6,364,938 B1 | 4/2002 | Birbara et al. | |
| 6,432,379 B1 * | 8/2002 | Heung | 423/648.1 |
| 6,436,175 B1 * | 8/2002 | Coates et al. | 96/126 |
| 6,585,111 B1 | 7/2003 | Shervington et al. | |
| 6,681,589 B2 | 1/2004 | Brudnicki | |
| 6,709,483 B1 | 3/2004 | Hodgson et al. | |
| 6,908,497 B1 | 6/2005 | Sirwardane | |
| 7,112,239 B2 * | 9/2006 | Kimbara et al. | 96/108 |

* cited by examiner

*Primary Examiner*—Frank M Lawrence
(74) *Attorney, Agent, or Firm*—Carlson, Gaskey & Olds (57) ABSTRACT

A swing bed canister assembly for a regenerative carbon dioxide removal system includes a housing that includes an integrally formed central wall that divides an adsorbing amine bed from a desorbing amine bed. The central wall defines spaces for each of the amine beds so that each portion of the desorbing amine bed is disposed in thermal communication with an adsorbing amine bed to facilitate desorption.

18 Claims, 5 Drawing Sheets

SWING BED CANISTER WITH HEAT TRANSFER FEATURES

BACKGROUND OF THE INVENTION

This invention generally relates to a system for removing carbon dioxide gas. More particularly, this invention relates to a regenerative carbon dioxide removal system for removing carbon dioxide from an enclosed space.

Life support systems that are utilized in enclosed spaces such as submarines, spacecraft or space suits require the continuous removal of carbon dioxide. A regenerative carbon dioxide removal system is utilized for this purpose and commonly includes amine beds that are placed in contact with a flow of carbon dioxide laden air. The amine beds adsorb carbon dioxide from the air stream through commonly understood chemical processes and reactions.

An amine bed is utilized until it is saturated and can no longer efficiently remove carbon dioxide from an air stream. Another amine bed is then switched into contact with the carbon dioxide laden air stream. The saturated amine bed is then desorbed to expel carbon dioxide in preparation for the next cycle.

The adsorption process generates heat, and the desorption process utilizes heat along with a pressure differential to expel the carbon dioxide. An adsorbing bed can be placed in thermal contact with a desorbing bed to utilize the generated heat to drive off the carbon dioxide.

A housing for the amine beds is typically constructed utilizing a complex arrangement of brazed amine support features and screens. The brazing process is a well known process that requires the entire housing to be exposed to a temperature sufficient to form the desired brazed joints. Disadvantageously, many brazed joints are not accessible once the brazing process is complete. In such instances, leaks or less then desirable joints require rework of the entire housing. Further, the structure of the amine beds can provide undesired pressure drops and poorly transfer heat between adsorbing and desorbing amine beds.

SUMMARY OF THE INVENTION

An example swing bed canister assembly for a regenerative carbon dioxide removal system includes a housing that includes an integrally formed central wall that divides an adsorbing amine bed from a desorbing amine bed. The central wall defines spaces for each of the amine beds so that each portion of the desorbing amine bed is disposed in thermal communication with an adsorbing amine bed to facilitate the desorbtion process.

The carbon dioxide removal assembly includes an integrally formed central wall. The central wall is castellated to define spaces for segments of each of the adsorbing and desorbing amine beds. Each of the segments of the amine beds is bounded by a segment from the other amine bed. In this way, the absorbing amine bed transfers heat to an adjacent segment of the desorbing amine bed. The heat transferred from the absorbing bed is therefore utilized efficiently to drive carbon dioxide from the desorbing amine bed.

The castellated integrated central wall eases assembly as no joints are required for the integrally formed central wall. Further, the central wall defines segments for each of the amine beds to minimize a distance between any part of the amine beds. The structure of the central wall improves heat transfer between the adsorbing and desorbing amine beds to facilitate efficient thermal communication and heat transfer.

These and other features of the present invention can be best understood from the following specification and drawings, the following of which is a brief description.

DETAILED DESCRIPTION OF THE PREFERRED EMBODIMENT

Figure 1:
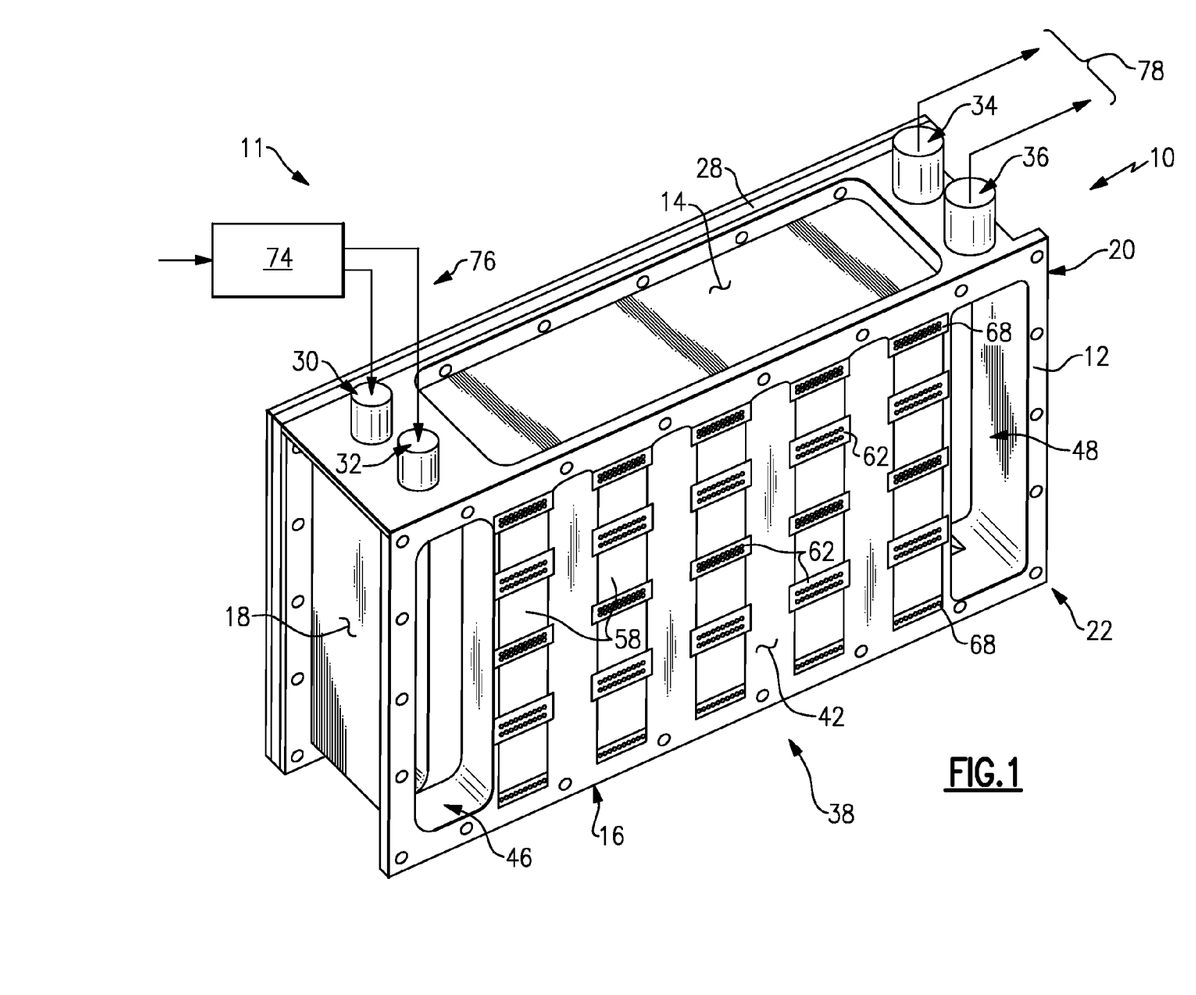
FIG. 1 is a perspective view of the example regenerative carbon dioxide removal assembly.

Referring to FIG. 1, an example swing bed canister 10 for a carbon dioxide removal system 11 includes a housing 12 having a top 14, a bottom 16, a first side 18 and a second side 20. The top 14, bottom 16 and sides 18, 20 of the housing 12 can be integrally formed. A central castellated wall 42 can also be integrally formed as part of the housing 12. The central wall 42 divides segments of a first amine bed 38 from segments of a second amine bed 40.

The housing 12 includes a first inlet 30 and a second inlet 32 into which carbon dioxide laden air indicated at 76 enters the swing bed canister assembly 10. Each of the inlets 30, 32 is in communication with a corresponding inlet manifold. FIG. 1 shows an inlet manifold 46 that corresponds with the inlet 32 for communicating carbon dioxide laden air with the first amine bed 38. A second amine bed 40 is not visible in FIG. 1 but is disposed on an opposite side of the central wall 42. The second inlet 30 communicates air with the second amine bed 40. The inlet manifold 46 is an open space that facilitates airflow into the first amine bed 38.

A first outlet manifold 48 is in communication with a first outlet 36 and is disposed on an opposite side of the swing bed canister assembly 10. A second outlet manifold (not shown) exhausts an air stream from the second amine bed 40 through outlet 34.

The housing 12 includes a first open side 22 and a second open side 24. A first cover 26 (FIG. 4) and a second cover 28 mount to the housing 12 to seal the swing bed canister assembly 10.

Figure 2:
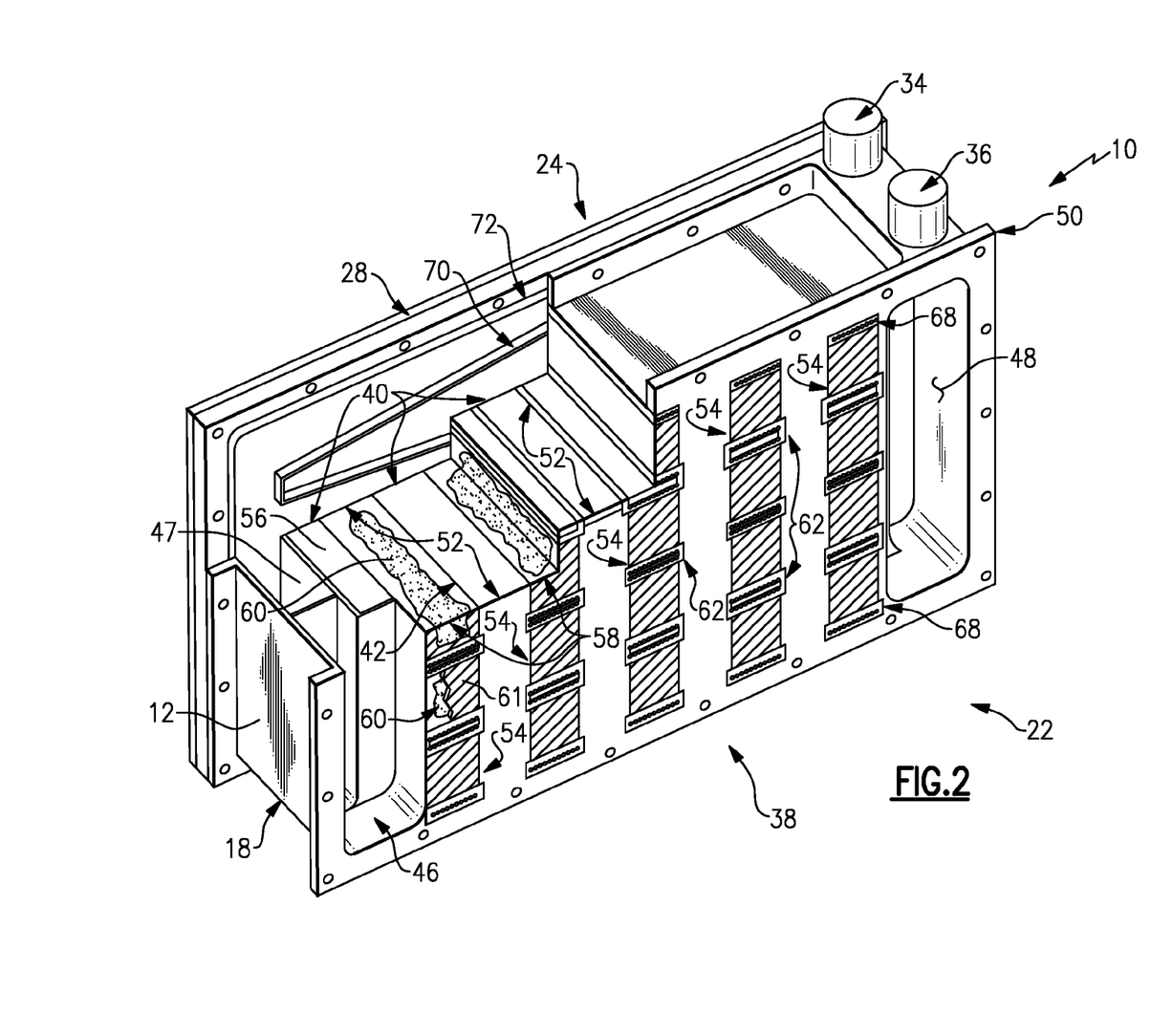
FIG. 2 is a partial cut away view of the example regenerative carbon dioxide removal assembly.

Referring to FIG. 2, the first and second amine beds 38, 40 are disposed within castellations 52 that are defined by the central wall 42. The first and second amine beds 38, 40 are composed of a plurality of reticulated blocks 58. Each block 58 includes an open space defined therein that is filled with carbon dioxide absorbing material. The disclosed example utilizes amine material 60 as the carbon dioxide absorbent, however other compounds and materials that are known in the art are also within the contemplation of this invention. The blocks 58 are attached to the central wall 42 within the space defined by the castellations 52 of the central wall 42. The blocks 58 provide for airflow therethrough while containing the amine material 60.

Each block 58 represents a portion of the entire amine bed and therefore provides a reduced pressure drop through the swing bed canister assembly 10. The reduced drop in pressure is provided as the plurality of blocks 58 are comparable to a large area of amine material piled in a relatively thin layer.

The air stream flow through the thin layer of amine material within each of the blocks 58 results in little drop in air pressure.

The central wall 42 divides the housing 12 into separate segments that correspond to each of the amine beds 38, 40. The first amine bed 38 includes five full segments 54 disposed within spaces 55 between castellations 52 defined by the central wall 42. Each full segment includes four blocks 58 that are separated by screen members.

The top and bottom of each segment 54 includes a single screen 68 and the middle blocks 58 include a double screen 62. The screens 68, 62 provide for the retention of the amine material disposed within the adjacent blocks 58 and also provides a passage for airflow laterally between the blocks 58.

The second amine bed 40 includes four full size segments 54 and two half size segments 56 (only one shown). The resulting first and second amine beds 38, 40 are of equal volume and include an equal amount of carbon dioxide absorbing material. Other numbers and combinations of full and half segments could be utilized to accommodate application specific requirements.

Figure 3:
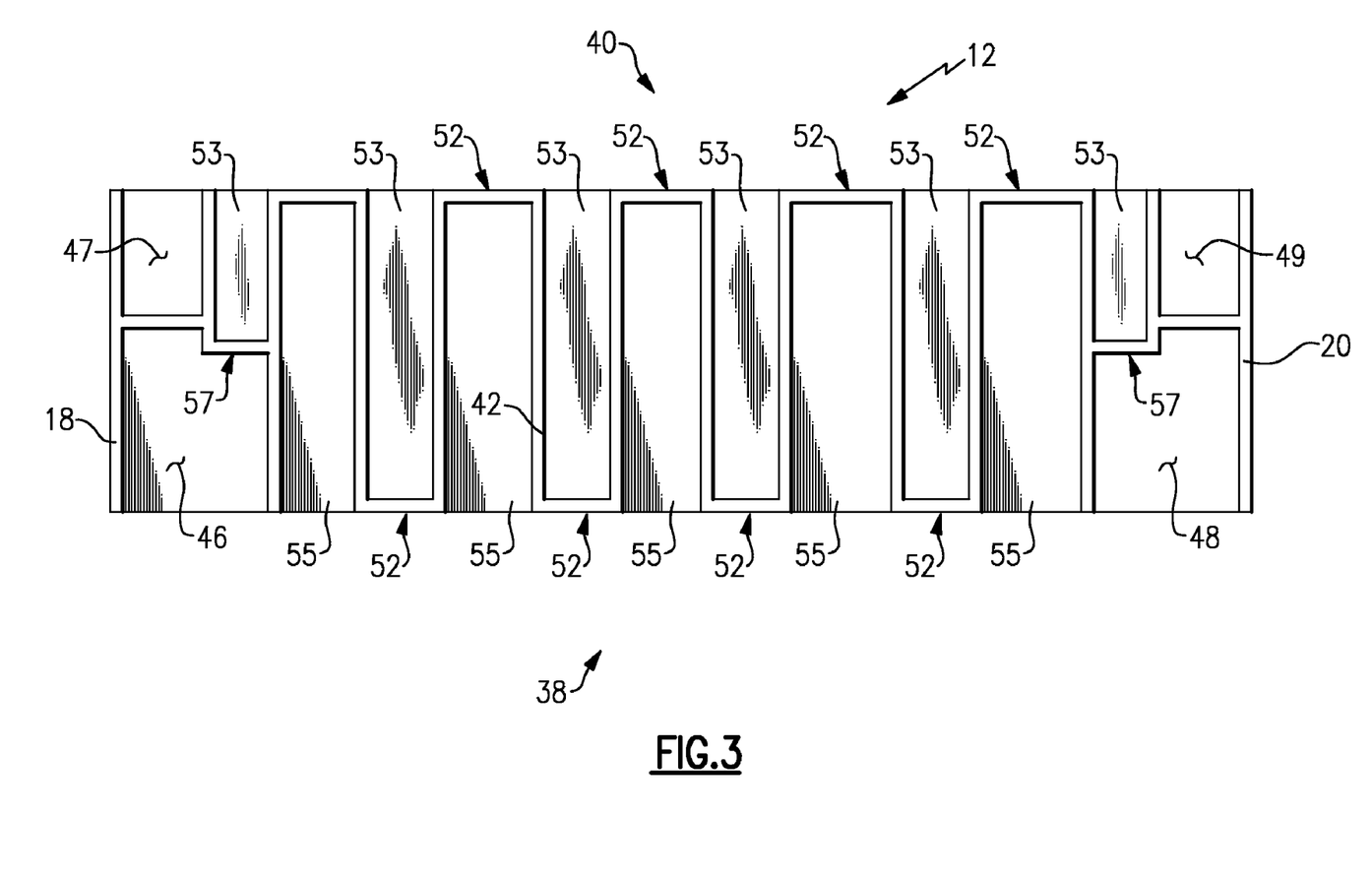
FIG. 3 is a cross-sectional view of the example housing of the example regenerative carbon dioxide removal assembly.

Referring to FIG. 3, a top cross-section view of the housing 12 without the blocks 58 is illustrated to provide a clear view of the integral central wall 42. The central wall 42 includes the castellations 52 that define spaces for each segment of the first and second amine beds 38, 40. The central wall 42 is an integral part of the housing 12 and therefore does not include brazed or welded joints. The central wall 42 defines the first and second inlet manifolds 46, 47. The central wall 42 also defines the first and second outlet manifolds 48, 49. The inlets manifolds 46, 47 and the outlet manifolds 48, 49 are integral structures that therefore do not require brazed or welded joints.

The first and second amine beds 38, 40 are disposed on opposite sides of the central wall 42. The castellations 52 define individual segments for each of the amine beds 38, 40. Segments of the first amine bed 38 are disposed within spaces 55 on one side of the central wall 42. Segments of the second amine bed 40 are disposed within spaces 53 defined on a second side of the central wall 42. The spaces 55 for the first amine bed 38 include five full castellations 52. The second amine bed 40 includes four full castellations 52 and two half castellations 57 to provide an area equal to the first amine bed 38.

Each segment of the first amine bed 38 is surrounded on adjacent sides by portions of the second amine bed 40. Heat generated during the absorption process is communicated through the central wall 42 to the desorbing bed. The placement of segments of the first amine bed 38 relative to the segments of the second amine bed 40 limits the maximum distance required to conduct heat between the amine beds 38, 40.

The amine material 60 supported within one of the spaces 53 is exposed to heat in an adjacent space 55 at the same magnitude as any other of the spaces 53. This relative position between segments of each amine bed 38, 40 provides for the uniform distribution and conduction of heat between amine beds 38, 40. The uniform distribution and conduction of heat improves overall operation of the swing bed canister assembly 10.

Referring to FIG. 2 with continued reference to FIG. 3, heat transfer between amine beds 38, 40 is further facilitated by the blocks 58. The example blocks 58 are fabricated from an aluminum material having favorable heat transfer properties. The blocks 58 are joined to the central wall 42 and thereby become substantially an integral portion of the housing 12. The joint between the blocks 58 and the central walls 42 facilitate the desired transfer and conduction of heat between segments of the amine beds 38, 40.

Figure 4:
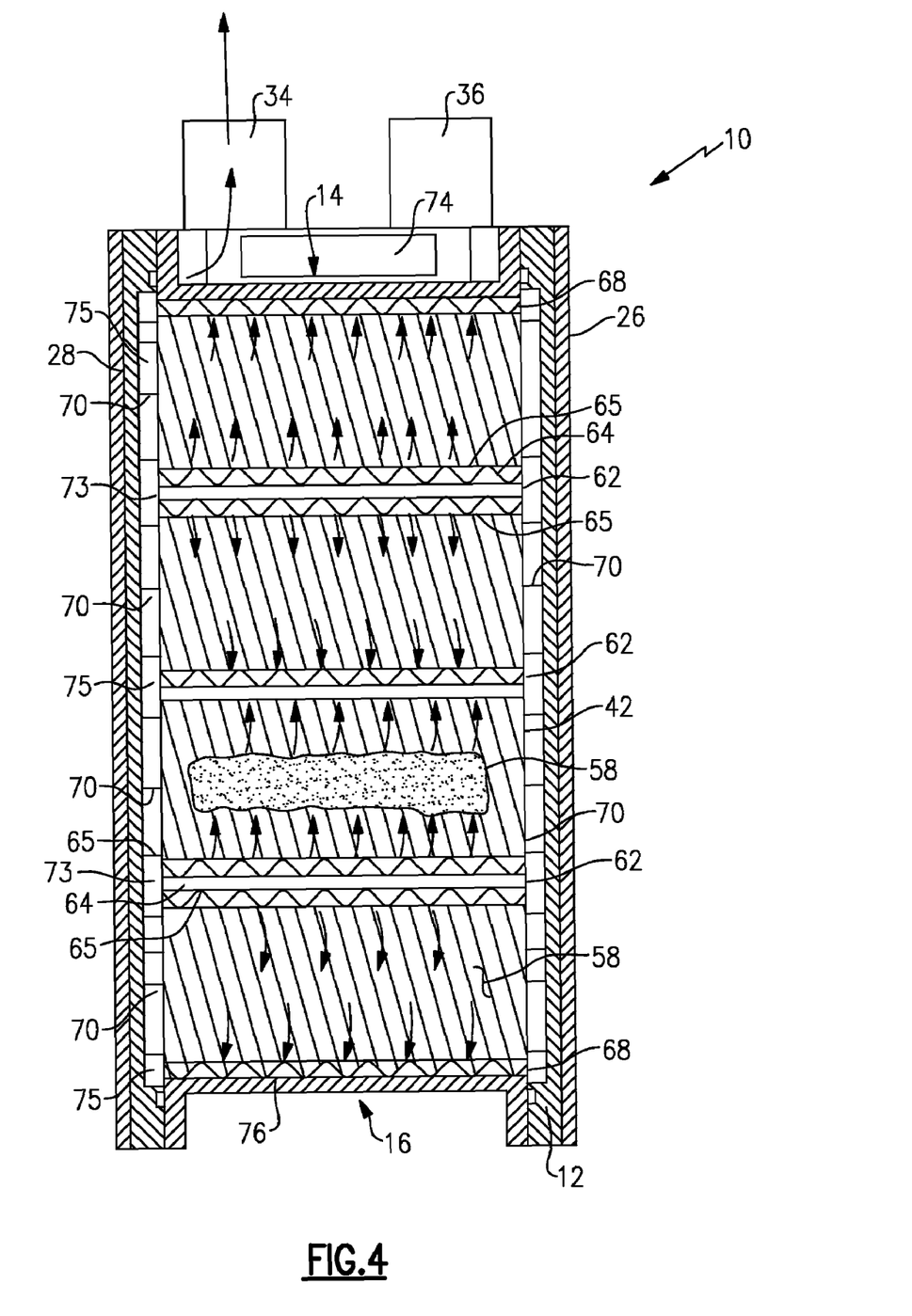
FIG. 4 is another cross-sectional view of a portion of the example regenerative carbon dioxide removal assembly.

Referring to FIG. 4, a cross-section of the example swing bed canister assembly 10 includes the first and second covers 28, 26 attached to the housing 12. Each of the first and second covers 28, 26 include a plurality of flanges 70 that extend inwardly toward the corresponding amine bed 38, 40. The flanges 70 define a flow passage to control and direct airflow through each segment of the corresponding amine bed 38, 40.

The screens 62, 68 contain the amine material 60 within the blocks 58 and define a flow path for air entering and exiting each of the blocks 58. The single screen 68 is disposed at the bottom and top of each segment. The single screen 68 is utilized at the ends of the segments where another block 58 is not disposed on the other side of the screen. The double screen 68 includes a screen member 65 above and below a tube 64. The double screen 68 is utilized between adjacent blocks 58.

The example illustrated in FIG. 4 is one segment of the second amine bed 40. Carbon dioxide laden air entering through one of the inlets 30 into the inlet manifold 47 is directed to inlets 73 by way of the flange 70 on the side panel 28. Air from the inlets 73 is directed through the double screens 62 adjacent the inlets 73. The screens 62 disperse air along the length of each face of the adjacent blocks 58. Air flow enters the blocks 58 and flows through the amine material 60 that is supported therein. The air exits each of the blocks 58 into another screen. At the top and bottom of the segment, air exits the blocks 58 through a single screen 68 and proceeds to an outlet 75. In the center of the segment, air exits blocks above and below a double screen 68 and exits through another outlet 75. Each of the outlets 75 are in communication with and direct air through to the outlet 34.

Operation of the example swing bed canister 10 begins with the intake of carbon dioxide laden air through one of the inlets 30, 32. In this example carbon dioxide laden air is directed through the second inlet 30 and into the second amine bed 40. The carbon dioxide laden air is directed through each of the amine filled blocks 58 within each of the segments of the second amine bed 40. The second amine bed 40 is therefore adsorbing carbon dioxide and generating heat.

The first amine bed 38 is concurrently undergoing a desorbing process to reject the carbon dioxide previously adsorbed. The desorbing process includes the communication of both the inlet 32 and the outlet 36 with an environment with a carbon dioxide partial pressure substantially less than that communicating during the adsorbing process, such as for example the hard vacuum of space or a flow of a purge gas such as pure dry nitrogen. The separate environment can include a storage container, or simply a port that exhausts to an outer environment. The outer environment is preferably at a pressure less than that within the swing bed canister assembly 10 to create a relative vacuum.

Heat generated by the second amine bed 38 is conducted through a block 58 to the central wall 42 and then through an adjacent block 58 of the first desorbing bed. The conduction of heat is facilitated by the close proximity between adsorbing and desorbing segments of the amine beds. Further, the central wall 42 and amine beds 58 provide few gaps or barriers to this transfer of heat. The combination of reduced pressure and heat in the desorbing first amine bed 38 facilitates expulsion of carbon dioxide from the desorbing bed to ready the bed for adsorbing once the currently adsorbing bed becomes saturated with carbon dioxide.

Completion of the adsorption process can be determined either according to a desired time or through sensors that sense the amount of carbon dioxide left in the amine bed. A control valve 74 (FIG. 1) is utilized to switch amine beds to communicate carbon dioxide laden air with the now freshly desorbed amine bed to provide a constant level of performance in carbon dioxide removal.

Referring to FIGS. 1-3, fabrication of the example swing bed canister assembly 10 includes the step of forming the housing 12 from an aluminum casting or by a machining process from a solid block of aluminum to include the central wall 42. The casting or machining process provides the desired continuous sealed structure of the central wall 42 within the housing 12. Because the central wall 42 is an integral portion of the housing 12, no additional fabrication steps are required to seal the spaces for the separate amine beds.

The assembly process continues with the attachment of the blocks 58 into each of the spaces defined by the central wall 42. The blocks 58 are fit into the spaces defined by the castellation of the central wall 42 and spaced a distance apart to provide space for the screens. The example blocks 58 are brazed in place according to known processes. However, the complexity of the brazing process is simplified, as every joint is a heat transfer element only and not part of a pressure barrier. Accordingly, this assembly process can accommodate small unbrazed or joined areas without compromising the desired pressure barrier.

With the blocks 58 secured in place to the central wall 42 the screens 68, 62 are placed between each of the blocks 58. The double screen members 62 include a tube 64 disposed between top and bottom screens 65 (FIG. 4). The single screen members 68 include only a single screen member 65. The blocks 58 are then filled with carbon dioxide adsorbing material. The example adsorbing material is amine material that is formed in small separate pellets. With the screens in place and the blocks filled, a tape 61 (FIG. 2) is placed over the exposed side face of each block 58 to further contain the amine material within the block 58.

The assembly is then substantially completed by attaching the covers 26, 28 to the housing 12. The covers 26, 28 define the desired air passages through the separate amine beds 38, 40. A seal 72 is disposed between each of the covers 26, 28 and the housing to seal the amine beds 38, 40. The swing bed canister assembly 10 is then fitted to a control valve 74 that switches between amine beds as required to maintain a desired level of carbon dioxide adsorbtion.

Figure 5:
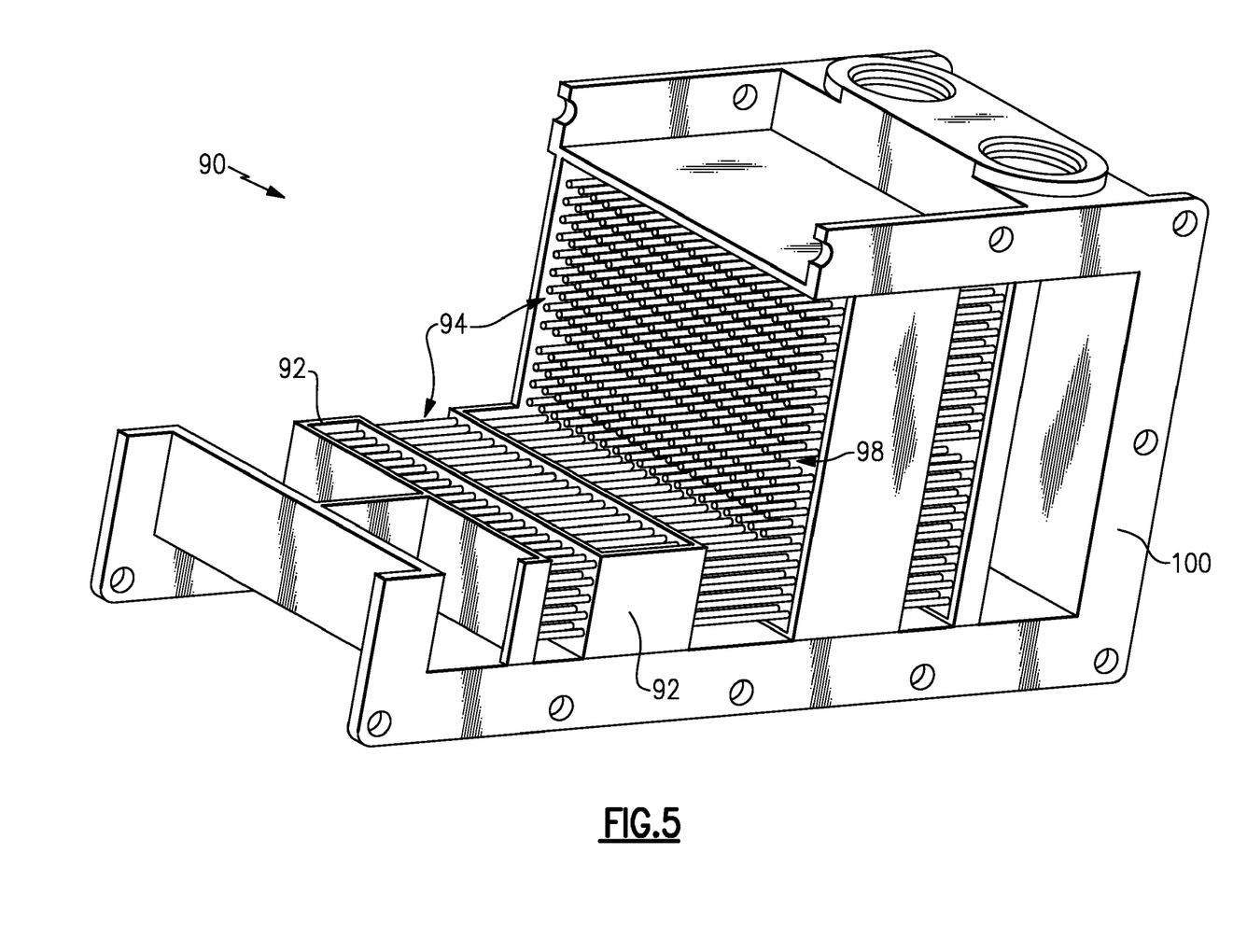
FIG. 5 is a partial cut away view of another example carbon dioxide removable assembly.

Referring to FIG. 5, another example swing bed canister assembly 90 includes a castellated center wall 92 that defines segments of each of the separate amine beds. Each segment is adjacent a segment of the other amine bed to provide the desired heat transfer properties and performance.

In this example a plurality of pins 94 extend between the central wall 92 within the spaces defined therebetween. The pins 94 replace the blocks 58 and provide for retention of the amine material and transfer of heat between segments. The pins 92 provide heat conductivity between adjacent segments on opposite sides of the central wall 92 to facilitate thermal communication between absorbing and desorbing beds.

The pins 94 are integrally formed with the housing as part of the central wall 92 by means of a casting or machining process to eliminate the need for attaching an amine support structure such as the example blocks 58. A slot 98 is provided by spacing the pins 94 further apart to provide a space for a screen member to contain separate amounts of amine material.

Assembly of the example swing bed canister 90 includes forming the housing 100 to include the integral central wall 92 and the plurality of pins 94. The central wall 92 includes castellations 96 that separate segments of each amine bed. Because the pins 94 are integrally formed with the housing 100, no further brazing or joining processes are required. The screens are inserted into the slots 98 and amine material filled into the spaces between the pins 94. The sides are then attached and the example swing bed canister 90 attached to a valve.

Accordingly, the castellated integral central wall defines a series of segments for each amine bed such that each amine bed is bounded by a segment of the other amine bed. This improves heat transfer between amine beds which in turn improves performance. Further, the integrated central wall eliminates many brazed and soldered joints to improve manufacturability and dependability during operation.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A regenerative carbon dioxide removal assembly comprising:
    a housing including an outer shell with first and second open sides, a central wall, a first inlet, a second inlet, a first exhaust, and a second exhaust;
    a first side wall covering the first open side and a second side wall covering the second open side, wherein each of the first side wall and the second side wall include channels for defining part of first and second flow paths between a corresponding one of the first inlet and the first exhaust and the second inlet and the second exhaust;
    a first carbon dioxide adsorbent bed in communication with the first inlet and the first exhaust;
    a second carbon dioxide adsorbent bed in communication with the second inlet and the second exhaust, where the first carbon dioxide adsorbent bed and the second carbon dioxide adsorbent bed are in thermal communication through the central wall; and
    a control valve for selectively communicating one of the first and second carbon dioxide adsorbent beds with an air stream containing carbon dioxide.

2. The assembly as recited in claim 1, wherein the central wall comprises a plurality of castellations separating the first carbon dioxide adsorbent bed from the second carbon dioxide adsorbent bed.

3. The assembly as recited in claim 2, wherein the first carbon dioxide adsorbent bed comprises a plurality of first segments and the second carbon dioxide adsorbent bed comprises a plurality of second segments, wherein the first segments are interfit between the second segments and separated by the plurality of castellations of the central wall.

4. The assembly as recited in claim 3, wherein each of the first segments and the second segments comprise a reticulated block filled with carbon dioxide absorbent material.

5. The assembly as recited in claim 4, wherein each of the reticulated blocks are attached to the central wall within one of the plurality of castellations.

6. The assembly as recited in claim 5, wherein a plurality of reticulated blocks are attached to the central wall within each of the plurality of castellations.

7. The assembly as recited in claim 6, wherein the plurality of reticulated blocks are separated by a retention screen.

8. The assembly as recited in claim 7, wherein the retention screen includes a tube defining a passage between the plurality of reticulated blocks.

9. The assembly as recited in claim 3, including a plurality of pins extending across the castellations of the central wall across each of the first segments and the second segments.

10. The assembly as recited in claim 9, wherein a carbon dioxide adsorbent material is disposed within each of the plurality of castellations and fills voids between the plurality of pins.

11. The assembly as recited in claim 10, including retention screens disposed within the plurality of castellations for retaining the carbon dioxide adsorbent material.

12. A method of assembling a swing bed canister for a regenerative carbon dioxide removal system comprising the steps of:
   a) forming a housing including an integrally formed central wall extending between a first side, a second side, a top and a bottom and defining a plurality of segments for each of at least two carbon dioxide adsorbent beds;
   b) mounting a plurality of support structures to the central wall;
   c) supporting a quantity of carbon dioxide adsorbent material with the plurality of support structures and within the segments defined by the housing;
   d) assembling a screen member for containing the carbon dioxide adsorbent within the plurality of support structures; and
   e) attaching sides to the housing to seal the interior of the housing.

13. The method as recited in claim 12, wherein the central wall is formed to define an inlet manifold and an outlet manifold that are in communication with an inlet and an outlet defined within the housing.

14. The method as recited in claim 12, wherein the plurality of supports comprises a reticulated block and the step of mounting a plurality of support structures to the central wall includes joining the reticulated block to the central wall.

15. The method as recited in claim 12, wherein the plurality of supports comprises a plurality of pins and the step of mounting a plurality of support structures to the central wall includes the step of integrally forming the plurality of pins into the central wall.

16. The method as recited in claim 12, wherein the central wall is castellated to define the plurality of segments for at least two carbon dioxide adsorbent beds.

17. The method as recited in claim 16, wherein the castellated central wall defines segments for each of the two carbon dioxide adsorbent beds that are disposed adjacent to each other.

18. A regenerative carbon dioxide removal sub-assembly comprising:
   a housing including an outer shell with first and second open sides, a central wall, a first inlet, a second inlet, a first exhaust, and a second exhaust;
   a first side wall covering the first open side and a second side wall covering the second open side, wherein each of the first side wall and the second side wall include channels for defining part of first and second flow paths between a corresponding one of the first inlet and the first exhaust and the second inlet and the second exhaust;
   a first open area in communication with the first inlet and the first exhaust for receiving a first carbon dioxide adsorbent bed;
   a second open area in communication with the second inlet and the second exhaust for receiving a second carbon dioxide adsorbent bed, and
   a control valve for selectively communicating one of the first and second carbon dioxide adsorbent beds with an air stream containing carbon dioxide; wherein the central wall is arranged to allow thermal communication between the first carbon dioxide adsorbent bed and the second carbon dioxide adsorbent bed.

* * * * *

UNITED STATES PATENT AND TRADEMARK OFFICE
CERTIFICATE OF CORRECTION

| | | |
|---|---|---|
| PATENT NO. | : 7,637,988 B2 | Page 1 of 1 |
| APPLICATION NO. | : 11/690201 | |
| DATED | : December 29, 2009 | |
| INVENTOR(S) | : Walter C. Dean, II | |

It is certified that error appears in the above-identified patent and that said Letters Patent is hereby corrected as shown below:

IN THE CLAIMS:

Claim 4, Column 6, line 53: "absorbent" should read as --adsorbent--

Signed and Sealed this

Sixteenth Day of March, 2010

David J. Kappos
*Director of the United States Patent and Trademark Office*